Figures 1, 2, 3, 4, 5:
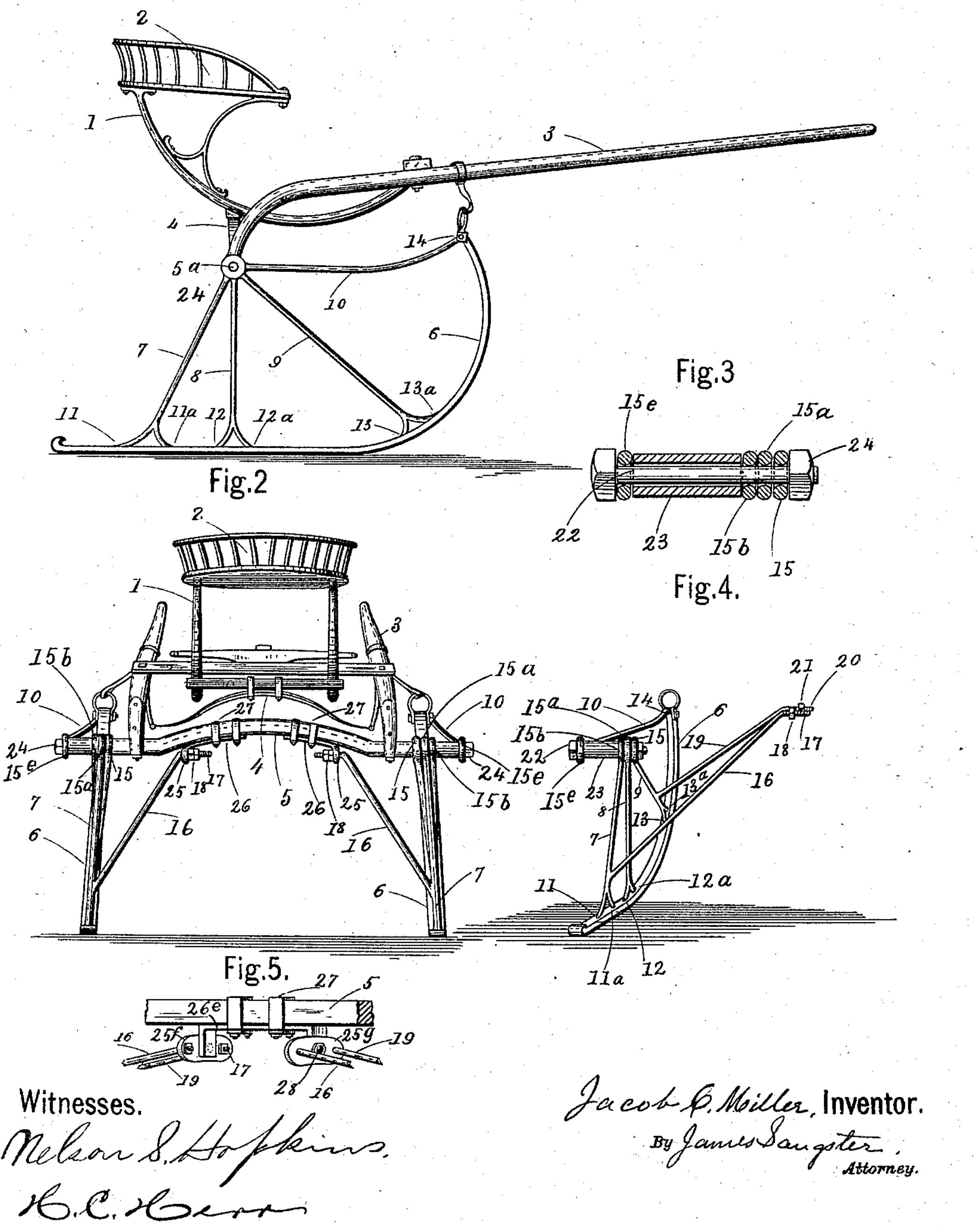

(No Model.)

J. C. MILLER.

SLEIGH RUNNER FOR WHEELED VEHICLES.

No. 537,614. Patented Apr. 16, 1895.

Witnesses.

Nelson S. Hopkins.

H. C. Herr

Jacob C. Miller, Inventor.

By James Sangster. Attorney.

THE NORRIS PETERS CO., PHOTO-LITHO., WASHINGTON, D. C.

UNITED STATES PATENT OFFICE.

JACOB C. MILLER, OF DUNKIRK, NEW YORK.

SLEIGH-RUNNER FOR WHEELED VEHICLES.

SPECIFICATION forming part of Letters Patent No. 537,614, dated April 16, 1895.

Application filed February 1, 1895. Serial No. 537,028. (No model.)

*To all whom it may concern:*

Be it known that I, JACOB C. MILLER, a citizen of the United States, residing at Dunkirk, in the county of Chautauqua and State of New York, have invented certain new and useful Improvements in Sleigh-Runners for Wheeled Vehicles, of which the following is a specification.

The object of my invention is to provide a simple means for easily and quickly changing a wheeled vehicle to a sleigh, and it will be fully and clearly hereinafter described and claimed, reference being had to the accompanying drawings, in which—

Figure 1 represents a side elevation of a sulky having the wheels removed and my invention connected thereto. Fig. 2 represents a rear view of the same, showing the means for securing the several parts together. Fig. 3 represents an enlarged detached sectional elevation, showing that part of the runner the axle spindle of the wheeled vehicle passes into. Fig. 4 represents a perspective view of the runner separate from the vehicle. Fig. 5 represents a perspective view, showing a modification of those parts where the diagonal braces are secured under the axle.

Referring to the drawings in detail, I have shown my invention attached to a sulky of well known construction with its wheels removed.

1 represents the ordinary sulky frame; 2, the seat; 3, the shaft. 4 represents the spring and 5, the axle, all of which are constructed of well known materials and in the usual way, consequently a further description of the sulky is not required here.

I have shown my device attached to an ordinary sulky but it is adapted for use on any wheeled vehicle.

The runners 6, are constructed of iron or steel, that being the most suitable material. They are provided with braces 7, 8, 9, and 10, which are preferably welded to the runner at or about the points 11, $11^a$, 12, $12^a$, 13, $13^a$ and 14. The opposite ends of the braces 7, 8 and 9, all converge substantially to one point and are each provided with eye pieces 15, $15^a$ and $15^b$. The brace 10, also extends at an incline slightly outward, to a point opposite the eye pieces 15, $15^a$, $15^b$ and is also provided with an eye $15^e$, the construction being such that the axle spindle ($5^a$) will pass through all the eyes 15, $15^a$, $15^b$ and $15^e$, as will appear farther on. To the brace 7, (see Figs. 2 and 4,) is rigidly attached, by welding preferably, a laterally or inwardly extending brace 16, having a portion 17, of its opposite or free end bent so as to extend horizontally and provided with a screw thread and nut 18. See Fig. 4. A similar brace 19, is also welded to the brace 9, (shown in Fig. 4) and extends inward and upward until it meets the portion 17, of the brace 16, where it is bent to a horizontal position and extends alongside and parallel with it. It is also provided with a screw thread 20 and a nut 21.

When it is desired to use the runners on a wheeled vehicle, a sulky for instance, all that is necessary to do is to remove the wheels and put the runners on, as follows:—The eye piece $15^e$, of a runner is passed first over the axle spindle, then the sleeve 23, and then the eye pieces of the other braces, after which the carriage nut 24, is put on to secure the whole rigidly together. The inner braces are then secured by removing the nuts 18 and 21, and these passing the eye piece 25, of a short bar, 26, over it and securing it with a nut and jam-nut. See Fig. 2. The bar 26, is then rigidly secured to the axle 5, by well known clips 27. By this construction the sleigh runners are firmly braced laterally and have a slight oscillating movement to allow the runners to accommodate themselves to any unevenness in the road over which it may pass. The straps 28, prevent too great an oscillating movement.

When the runners are not in use the ends of the braces are held firmly together by a bolt, 22, (see Fig. 3) which passes through the eye piece $15^e$, the sleeve 23, and eye pieces 15, $15^a$ and $15^b$, and is secured by a nut 24, substantially as shown in Fig. 4. In this condition the device can be put away until required for use.

In the modification shown in Fig. 5, $25^f$ and $25^g$ represent plates pivoted to a holding piece $26^e$, secured by clips 27, to the axle. These pivoted plates $25^f$ and $25^g$, are capable of an oscillating movement on their pivots 28. The diagonal bars 16 and 19, are secured rigidly to these pivoted plates by nuts 18.

I claim as my invention—

1. A removable sleigh runner, consisting of a runner provided with supporting runner braces extending from the runner to a common point and provided with eye pieces located in a line with each other so that all can pass over an axle spindle, a sleeve also adapted to pass over the axle spindle and between the inner and outer eye pieces of the braces, in combination with diagonal braces and means substantially as above described for securing the runner to a wheel vehicle axle and axle spindle.

2. In a removable sleigh runner, the combination of a runner 6, a series of runner braces extending from the runner to a common point and provided with eye pieces located in a line so as to be capable of all passing over an axle spindle, a sleeve interposed between the inner and outer eye pieces of the braces, means for securing the whole together, and two diagonal braces extending from the runner braces inward and toward each other and each terminating in a short screw threaded portion bent slightly out of line with the braces and provided with a nut, substantially as and for the purposes described.

JACOB C. MILLER.

Witnesses:
GEORGE PAXTON,
ADELBERT W. CUMMINGS.